US010701167B1

(12) United States Patent
Kuo et al.

(10) Patent No.: US 10,701,167 B1
(45) Date of Patent: Jun. 30, 2020

(54) ADAPTIVE QUORUM FOR A MESSAGE BROKER SERVICE

(71) Applicant: Amazon Technologies, Inc., Seattle, WA (US)

(72) Inventors: Calvin Yue-Ren Kuo, Mercer Island, WA (US); Himanshu Jindal, Seattle, WA (US); Jonathan I. Turow, Seattle, WA (US); Frank Miley, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 15/255,130

(22) Filed: Sep. 1, 2016

(51) Int. Cl.
*H04L 29/08* (2006.01)
*H04L 12/24* (2006.01)
*G06F 15/16* (2006.01)

(52) U.S. Cl.
CPC ........ *H04L 67/2809* (2013.01); *H04L 41/147* (2013.01); *H04L 67/12* (2013.01); *H04L 67/26* (2013.01); *G06F 15/16* (2013.01)

(58) Field of Classification Search
None
See application file for complete search history.

(56) References Cited

U.S. PATENT DOCUMENTS

| | | | |
|---|---|---|---|
| 2006/0090095 A1* | 4/2006 | Massa | G06F 11/1479 714/4.11 |
| 2009/0083586 A1* | 3/2009 | Warner | G05B 23/021 714/47.1 |
| 2009/0144720 A1* | 6/2009 | Roush | G06F 8/65 717/171 |
| 2015/0312179 A1* | 10/2015 | Ben-Ezra | H04L 51/043 709/203 |
| 2016/0036924 A1* | 2/2016 | Koppolu | H04L 67/16 709/224 |
| 2016/0259705 A1* | 9/2016 | Barsness | G06F 11/3447 |

* cited by examiner

*Primary Examiner* — James A Edwards
(74) *Attorney, Agent, or Firm* — Thorpe North & Western, LLP.

(57) ABSTRACT

A technology is provided for adapting a quorum size of messaging nodes in a service provider environment. An adaptive quorum evaluation is executed to determine a number of messaging nodes for a quorum of messaging nodes. A messaging environment trigger is identified to change the number of messaging nodes used for the quorum of messaging nodes. The number of messaging nodes used for the quorum of messaging nodes is changed based on the messaging environment trigger. Data for the message is synchronized with a quorum of messaging nodes before delivering the message.

20 Claims, 9 Drawing Sheets

ADAPTIVE QUORUM FOR A MESSAGE BROKER SERVICE

BACKGROUND

Electronic devices and computing systems have become ever-present in many aspects of society. Devices may be found in the workplace, at home, or at school. Computing systems may include computing and data storage systems to process and store data. Some computing systems have begun offering centralized, virtual computing options known as service provider environments that may reduce overall costs, improve availability, improve scalability, and reduce time to deploy new applications.

Advancements in communication technologies have allowed for even relatively simple electronic devices to communicate with other devices and computing systems over a computer network. Computing networks or service provider environments may also communicate with Internet of Things (IoT) devices to gather and/or generate data or perform other functions. Devices, including IoT devices, may communicate with each other or with other networked devices using various protocols. The various protocols may be employed by the IoT devices to send data or to receive commands from other devices. The amount of communications sent over the various protocols may be described as a data load.

DETAILED DESCRIPTION

Figure 1A:
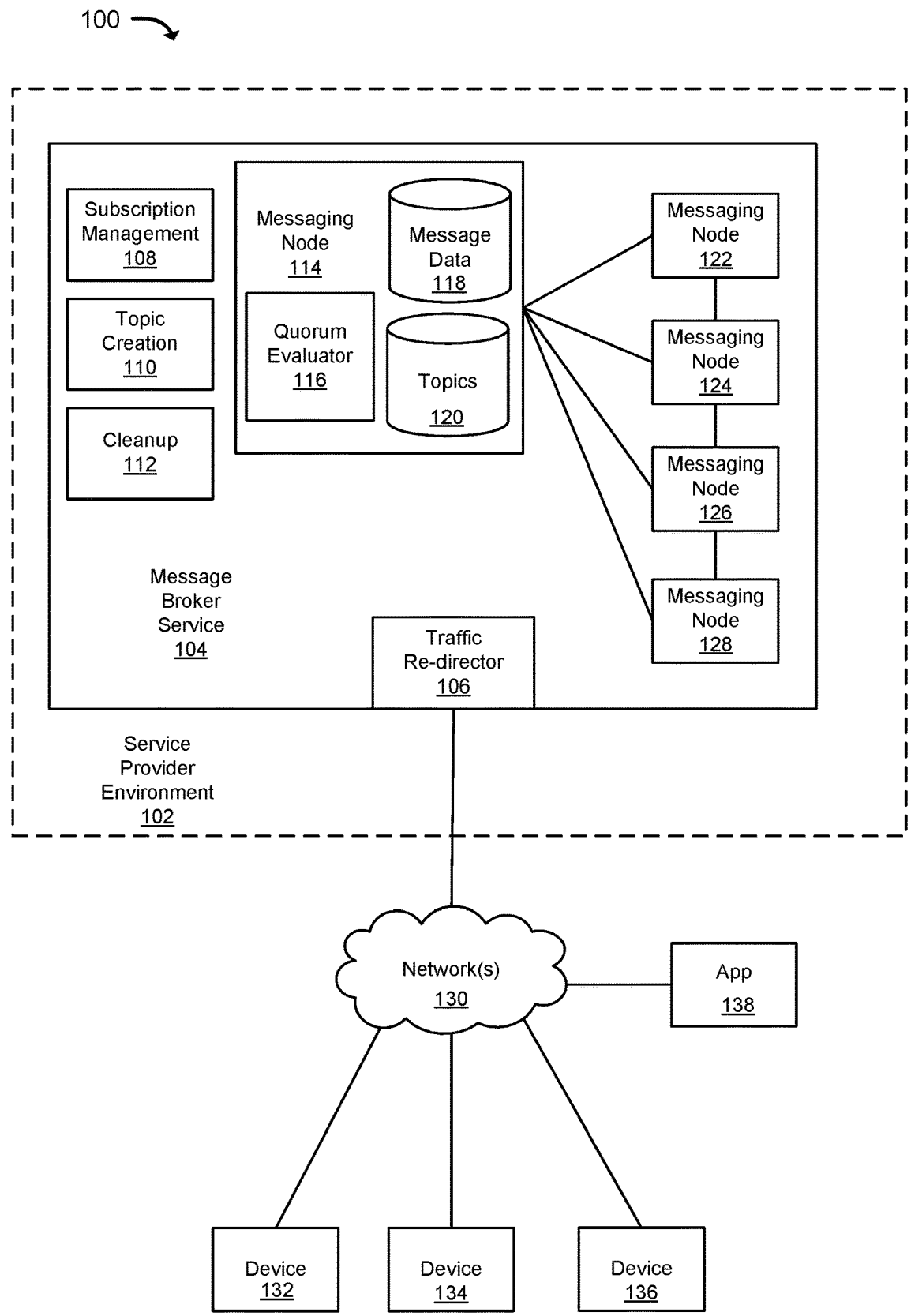
FIG. 1A is a block diagram illustrating a system for an adaptive quorum for a quorum of nodes of a message broker according to an example of the present technology.

The present technology may use an adaptive quorum evaluation or method at a messaging broker service or a messaging node to establish a number of messaging nodes for a quorum of messaging nodes (e.g., messaging servers) in a message broker or messaging broker services in a service provider environment. A messaging node may be configured to synchronize data for a message with the other messaging nodes in the quorum before sending the message. For example, the messaging node may be associated with a message broker service employed to manage messages sent and received by the messaging node. The number of messaging nodes that make up a quorum may change over time. The adaptive quorum evaluation may be executed in response to a messaging environment trigger and subsequently change the number of messaging nodes used within quorum to send and receive messages.

Messages in a service provider environment may be sent between devices or requestors via a messaging node using various protocols, such as a publish-subscribe model also referred to as a pub/sub model (e.g., a push messaging model), using polling of message queues that hold messages (e.g., a pull messaging model), distributed streaming models, or other messaging models. A publish-subscribe messaging model can be described as a messaging configuration where senders of messages, called publishers, publish messages to topics or classes. Similarly, subscribers express interest in one or more topics by subscribing to the topic and receive messages that are of interest. Any number of subscribers may subscribe to a topic. In one implementation, the publish-subscribe model may employ a message broker service to handle receiving and distribution of messages. The message broker service may include a component that manages topic subscriptions of the connected devices or IoT devices. In one aspect, the system may manage subscriptions for thousands, millions or billions of devices across potentially tens of millions or billions of topics. To compensate, a subscription management component may be employed and may be distributed across hundreds of servers in the message broker service. In such a system configuration, a replication delay of data regarding subscriptions, messages, and message topics or other errors may be higher when the system is under load or when there are node failures within the message broker service. This may cause the message broker service to miss delivery of messages to topics because the subscription information may not reflect the latest list of subscribers. Other messaging errors may also be caused by unexpectedly slow synchronization of messages and data between messaging servers.

In one aspect, to better avoid such errors, a quorum of synchronized messaging nodes may be used. The ability to determine a size of this quorum of messaging nodes may employ an adaptive quorum evaluation or calculation to determine a number (N) of messaging nodes which make up a quorum of messaging nodes for synchronization purposes. The adaptive quorum method may be referred to as a quorum read method, an adaptive quorum evaluation, or a quorum evaluation. The message broker service may then communicate with the other messaging nodes in the quorum of messaging nodes to synchronize data for messages delivered. This may ensure that the subscriber list or other messaging information is up to date for a given messaging node. The synchronizing may occur at various times or periodic times during the operation of the message broker service. For example, the synchronizing may occur before a message is sent or may occur at a predetermined time or interval of time. Data for the message may initially disagree between two messaging nodes, but will eventually be the same once the nodes have been updated with current data (e.g., the synchronization will be eventually consistent). Using the quorum of messaging nodes to synchronize data allows a messaging node or more than one messaging node to fail and the message may still be delivered. The number of messaging nodes used for a quorum may dynamically change or be calculated in response to a messaging environment trigger. A messaging environment trigger may be activated in response to a change in any number of factors including: a number of subscribers to a topic, a change in data for the messages in the service provider environment, a messaging node failure, a period of time when a messaging node is taken offline, etc. In an example of the messaging environment trigger, the factors may be provided with a weighting value and when the sum, multiplication, mean or other mathematical analysis of those weighting values exceeds a certain threshold value, then the messaging environment trigger may be executed to evaluate and compute a quorum size.

The adaptive quorum evaluation may further employ a consistency predictive function to determine or predict what a data load may be for a future time in the service provider environment. This prediction regarding data load may be a messaging environment trigger and when the data load reaches a threshold the adaptive quorum evaluation may be re-calculated. The adaptive quorum evaluation may periodically call the consistency predictive function to determine the number of messaging nodes to be used for a quorum. The messaging node may also employ a gossip method to determine if other messaging nodes within the service provider environment are online or offline.

FIG. 1A illustrates a computing environment 100 for applying an adaptive quorum evaluation with a message broker service in a service provider environment according to an example of the present technology. The computing environment 100 may include a service provider environment 102 that includes a message broker service 104.

The service provider environment 102 may be described as a plurality of computing systems or services employed to provide virtualized computing services accessible to other devices or software via a network 130 (e.g., the internet). In one aspect, the service provider environment 102 may be connected to a device 132, 134, 136 and/or an application 138 via the network 130. It should be appreciated that the devices 132, 134, 136 may be computing devices such as desktop computers, mobile devices, smart phones, set-top boxes, tablet computers, or IoT devices. The app 138 may be a software application executing on a device such as a desktop computer, workstation, server, IoT device or another device capable of executing the software application. The devices 132, 134, 136 and the app 138 may generate data and may send messages to and receive messages from the service provider environment 102.

In one aspect, the message broker service 104 may include a worker process designed to generate messaging requests for messages. The messaging node 114 may receive a messaging request from the worker process. The messaging request may be a request to obtain a message which will be delivered to a device 132. The worker process in conjunction with the messaging request may operate to push messages to a device from the messaging node 114. In a different aspect, the device 132 may send a messaging request or a read request to the message broker service 104 via network 130 where the messaging request desires to obtain message data from the message broker service 104. The message request may be first received by the traffic re-director 106 that is a component of the message broker service 104 and directs the messaging request to an appropriate messaging node such as messaging node 114. The traffic re-director 106 may also direct messages from a messaging node to the devices 132, 134, 136. In one aspect, the messaging request is a request for a message or data associated with a topic that the device 132 is subscribed to. The traffic-redirector may act a load balancer to determine which messaging node should receive the message depending on the topic that is being sent to or subscribed to.

The message broker service 104 may employ a subscription management 108 server or module to spread the messaging topics and/or subscriptions across a plurality of nodes to manage the topics and subscriptions. The subscription management 108 module may replicate topics and subscriptions to a topic across multiple messaging nodes such that there are more than one messaging nodes or more than one quorum responsible for the messaging traffic related to a given topic. This may be due to a large number of topics or subscriptions for the given topic. The subscription management 108 module may utilize an eventually consistent communication model where topics and subscriptions for a topic are replicated to multiple nodes within the service provider environment 102 asynchronously. The topic creation 110 module or server is also a component of the message broker service and allows topics for a publish-subscribe model to be created. The topics may be user created or machine created (e.g., IoT device created). The cleanup 112 module or server is also associated with the message broker service 104 and is employed to cleanup topics. For example, a topic may be removed that is no longer in use. The cleanup 112 module may also delete a topic after receiving a command from a user, and the cleanup 112 may also be employed to delete subscriptions to a topic.

A messaging node 114 may be a computing node, server or functional module within the service provider environment 102. The messaging node 114 may be a physical device or may be a virtualized computing instance, such as a virtual machine, executing on a portion of a physical device or one or more physical devices. The messaging node 114 may include topics 120 (e.g., a topic may be formatted: device/IoT/lightbulb/onoffcontrol) that are topics that may be created by the topic creation 110 module. The topics 120 may be topics for a publish-subscribe model where a device 132 may publish messages or data to a topic or may subscribe to a topic to receive the messages or data that are published to that topic. The messaging node 114 also comprises message data 118 which is the data or messages for at least one topic of the topics 120. The message data 118 may be received from a device 132, 134, 136 or the app 138 or another message producer or consumer.

In one aspect, the messaging node 114 comprises a quorum evaluator 116 which may include a quorum read method, a quorum evaluator, or adaptive quorum process. The quorum evaluator 116 may be employed to determine or calculate the number of messaging nodes for a quorum of messaging nodes. The quorum read evaluator 116 may dynamically change the number of messaging nodes during operations of the message broker service 104. In a specific example, the quorum read evaluator 116 may determine that a quorum size is two messaging nodes meaning the messaging node 114 plus one other messaging node such as messaging node 122. However, during operations of the message broker service 104, the quorum read evaluator 116 may detect or identify a messaging environment trigger and dynamically change the quorum size to four, which may mean the messaging node 114 plus three other synchronized messaging nodes. The messaging nodes within the same quorum may be messaging nodes that are duplicates of one another due to the synchronization taking place. The requests to read, write, perform message operations and the messages themselves may be synchronized between the members of the quorum to maintain the integrity of the data within the quorum. If one messaging node does not receive a message soon enough due to congestion, then another messaging node may receive the message and copy that message to the other members of the quorum.

In one aspect of the present technology, the messaging node 114 synchronizes the message data 118 with the message data from another messaging node before the message is delivered. The message data 118 for the message may be synchronized with more than one other messaging node. The number of messaging nodes that the messaging node 114 synchronizes with is the number of nodes that make up a quorum. The number of a quorum size may dynamically change during the operations of a messaging node. For example, the number of a quorum size may be determined to be two, therefore messaging node 114 will synchronize the message data 118 with the message data from one other messaging node, such as messaging node 122, before delivering a message. Subsequently, the number of the quorum size may change to four for the messaging node 114. Then messaging node 114 may synchronize the message data 118 with the message data from three other messaging node, such as messaging nodes 122, 124, and 136, before delivering a message.

In the service provider environment, a messaging node may be launched as a virtual node, virtual computing instance, or virtual server in a matter of minutes (e.g., 2-6 minutes). This a comparatively fast launching of the messaging node as compared to the provisioning of a hardware server or node. This faster provisioning of a messaging node means the size of the quorum can be changed relatively quickly and in response to changing demands against the quorum or for the message broker service.

The additional messaging nodes 122, 124, 126, and 128 may also be associated with the message broker service 104. The subscriptions for topics associated with messaging node(s) 114 may be managed by the subscription management 108. It should be appreciated that the additional messaging nodes 122, 124, 126, and 128 may have the same features and capabilities of the messaging node 114 and may or may not be duplicates of the messaging node 114. For example, each of the messaging nodes 122, 124, 126, and 128 may have a quorum evaluation function on the messaging node. In one aspect, the messaging node 122 is a synchronized copy of the messaging node 114 and therefore may be in the same quorum as the messaging node 114.

Figure 1B:
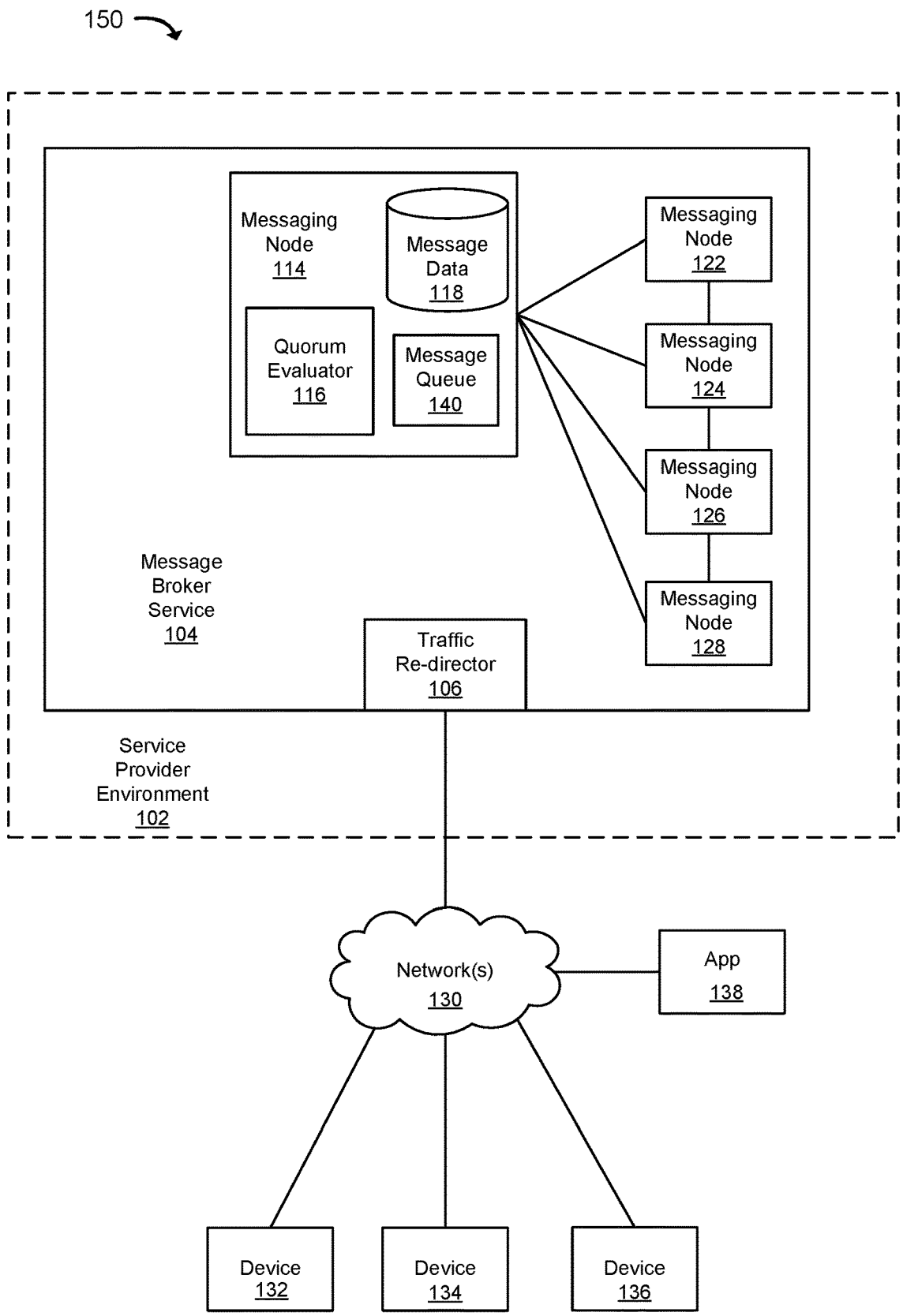
FIG. 1B illustrates an additional system using an adaptive quorum with a quorum of nodes for a message broker according to an example of the present technology.

FIG. 1B illustrates a computing environment 150 for an adaptive quorum evaluation for a message broker service in a service provider environment according to an example of the present technology. The computing environment 150 may include a service provider environment 102 that includes a message broker service 104 with many of the same features and components of computing environment 100 of FIG. 1A.

The messaging node 114 of computing environment 150 comprises a message queue 140 for a messaging system that employs a message queue. Each messaging node in the message broker service 104, such as messaging nodes 122, 124, 126, and 128, may each comprise a message queue or parts of a message queue. In one aspect, the message queue 140 provides an asynchronous communications protocol, such that the sender and receiver of the message do not need to interact with the message queue at the same time. Messages placed onto the queue are stored in message store 142 of messaging node 114 until a recipient, such as device 132, retrieves them. The message queue protocol of computing environment 150 employs a quorum evaluator 116 at the messaging node 114 to determine the number of messaging nodes for a quorum. It should be appreciated that the present technology may be implemented using a variety of messaging protocols including a publish-subscribe messaging model, message queueing, email, short service message service (SMS), instant messaging, or other protocols. The protocol may be pushed based or pull based.

Figure 2A:
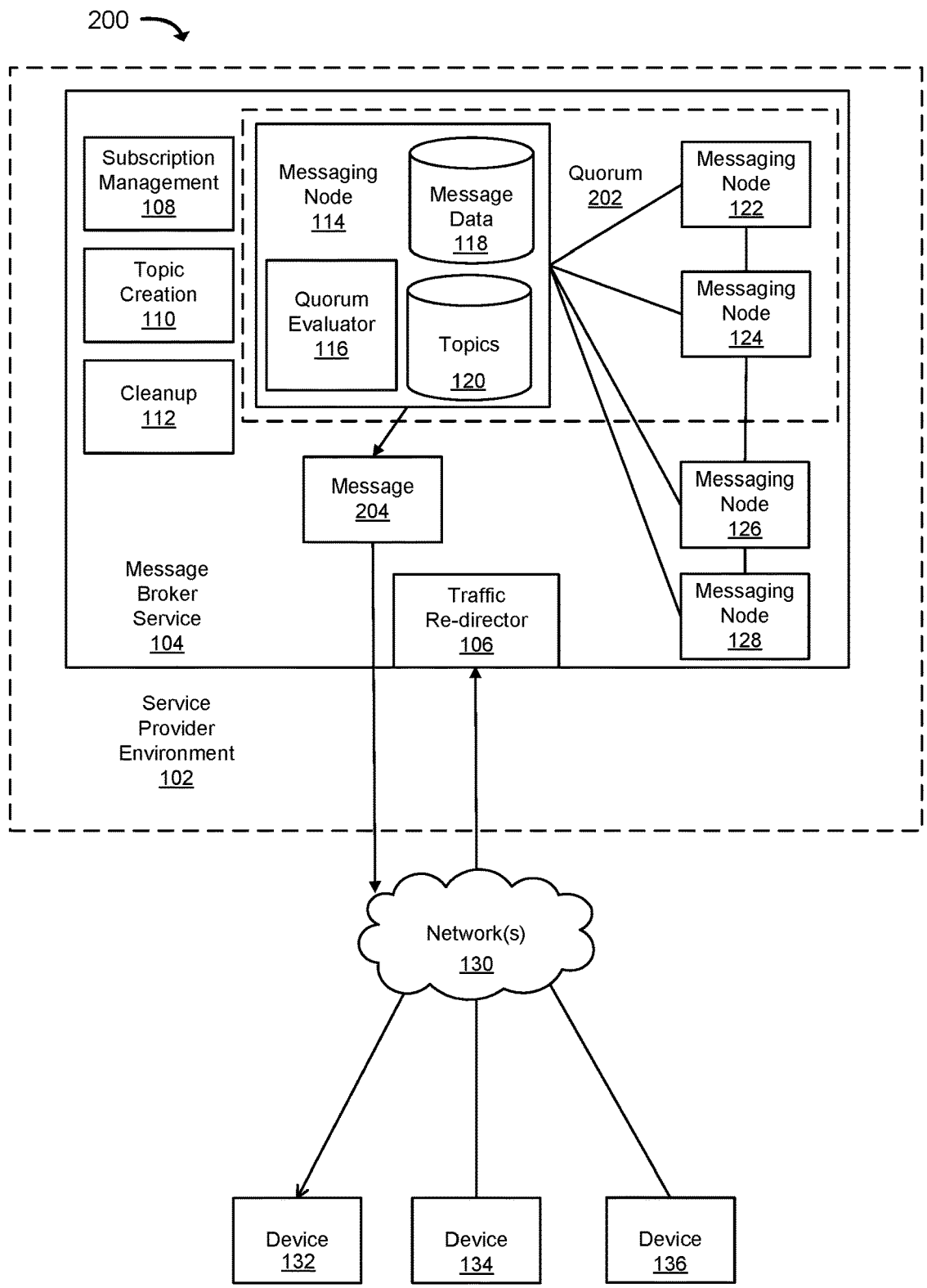
FIG. 2A illustrates an additional system using an adaptive quorum for a quorum of nodes of a message broker according to an example of the present technology.

FIG. 2A illustrates a computing environment 200 for an adaptive quorum evaluation with a message broker service in a service provider environment according to an example of the present technology. The computing environment 200 may include many of the same features and components of computing environment 100 of FIG. 1A.

In one aspect, device 132 may subscribe to one of the topics in the topics 120 module of the messaging node 114. The device 132 may receive message data 118 that is data that has been published to the topic and the message is pushed out the device 132 by the messaging node 114. The computing environment 200 depicts a quorum 202 with a dotted line that encompasses a first messaging node 114, a second messaging node 122, and a third messaging node 124. The quorum evaluator 116 may have determined that a number of messaging nodes to use for a quorum with the messaging node 114 is three. Thus, the first messaging node 114 is part of the quorum 202 which comprises three messaging nodes. The quorum evaluator 116 may pick a quorum size and then the first messaging node 114 may synchronize the message data 118 with the other messaging nodes of the quorum 202. Once the message data 118 has been synchronized with the data from the second messaging node 122 and the third messaging node 124, then the first messaging node 114 may send a message 204 to device 132 for a topic to which the device 132 is subscribed.

The synchronizing operation may synchronize the actual message data 118 or the synchronization operation may synchronize other data related to messages, such as the topics 120, the subscribers to topics, load data, or metrics related to the environment triggers. In one configuration, message 204 is not sent in response to a messaging request, but is rather sent based on polling of a named queue. The message 204 may be data generated or collected by an IoT device such as temperature, the status of a device such as a light bulb or lock, or other data. The message 204 may also be a command to an IoT device. For example, the IoT device may be light bulb that subscribes to a topic and a device such as the device 134 publishes a command to topics 120 for the light bulb to turn on or off.

During operations of the message broker service 104, the quorum evaluator 116 may change the number of nodes used for the quorum 202 to more or less than the example default of three messaging nodes. Any default number of messaging nodes may be included in a quorum and then the quorum size may be modified from that point by the quorum evaluator 116.

Changes in the number of messaging nodes used in a quorum may be precipitated by a messaging environment trigger. The messaging environment trigger may be a trigger that occurs within the service provider environment 102 or the message broker service 104 that is interpreted by the quorum evaluator 116 to change the size or number of messaging nodes used for the quorum. The messaging environment trigger may be of different types and may be based on events or data that is read from a data store associated with the message broker service 104. The quorum evaluator 116 may employ different methods or evaluations to identify a messaging environment trigger. For example, the quorum evaluator 116 may employ a consistency predictive function or a gossip method for transfer of data between messaging nodes. In one aspect, the quorum evaluator 116 constantly monitors metrics within the messaging node 114 and the service provider environment 102 to determine the quorum size.

In one example, the consistency predictive function is a function that is employed to determine an actual change in a data transmission load (e.g., messaging load) or a predicted change in the data transmission load caused by the message traffic within the service provider environment 102 and the message broker service 104. For example, the consistency predictive function may predict that message traffic for a certain topic or topics is higher at a particular time of day. Therefore the quorum evaluator 116 will determine that the number of messaging nodes for a quorum for the messaging nodes that host that certain topic at that time of day may be increased. The quorum evaluator 116 may periodically call upon the consistency predictive function to determine the quorum size.

In another aspect, the messaging environment trigger may be a change in the number of subscribers to a topic or group of topics within the message broker service 104. For example, the number of subscribers to a given topic may suddenly increase which in turn increases the load from message traffic for that topic. Similarly, the number of messages sent to a particular topic may increase. Thus, the likelihood of errors in messages for that topic increases. Therefore, the quorum evaluator 116 may change the quorum size to a higher number for messaging nodes that host the given topic. Conversely, if the number of subscribers to a given topic goes down, the number of messaging nodes used for a quorum may also be reduced.

In one aspect, the messaging environment trigger is a messaging node going offline, a messaging node that is expected to go offline, identified poor health of a messaging node, or an overall probability being tracked that messaging node may go offline (e.g., probability that a messaging node may crash based on received errors). If a node goes offline or is expected to go offline, then this also increases the likelihood of errors for messages associated with topics hosted by the node that went offline or may go offline. For example, a messaging node 122 may go offline for scheduled maintenance or updating. If a node is scheduled to go offline, then the quorum evaluator 116 may be informed ahead of time to increase the quorum size. However, a messaging node may also go offline due to unexpected hardware or software failure. A gossip method may be employed by the quorum evaluator 116 or the message broker service 104 to periodically determine if messaging nodes in the service provider environment 102 are online or not. It should be appreciated that methods other than a gossip method (e.g., polling) may be employed to determine if a messaging node is offline. If a node is detected to be offline or anticipated to go offline, then the quorum evaluator 116 may respond by increasing the quorum size.

It should be appreciated that increasing the size of a quorum to N messaging nodes effectively increases the cost to deliver a message by a factor of N. Therefore the quorum evaluator 116 may operate to determine the smallest quorum size that will be effective for synchronizing the quorum efficiently. In one aspect, the cost (e.g. resources and/or time) to deliver a message is a factor used to determine whether to increase or decrease the size of a quorum.

Figure 2B:
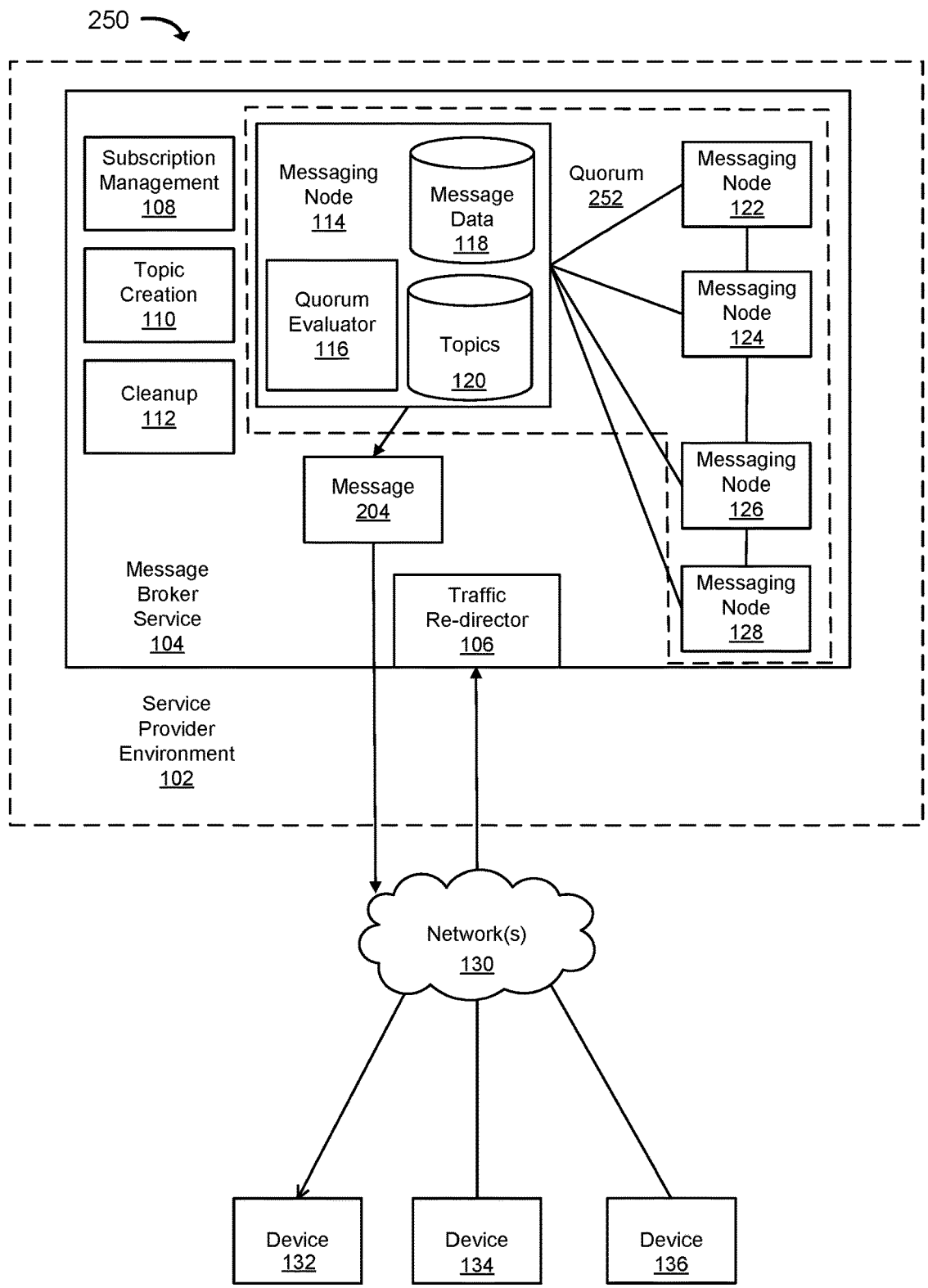
FIG. 2B illustrates an additional system with a quorum size different than the quorum size of FIG. 2A according to an example of the present technology.

FIG. 2B illustrates a computing environment 250 for an adaptive quorum evaluation with a message broker service in a service provider environment according to an example of the present technology. The computing environment 250 may include many of the same features and components of computing environment 200 of FIG. 2A. The computing environment 250 depicts a quorum 252 which comprises multiple messaging nodes 114, 122, 124, 126, and 128 depicted by a dotted line encompassing the messaging nodes. The quorum 252 encompasses five messaging nodes which is different from the three messaging nodes depicted by quorum 250 of FIG. 2A. For example, during the operation of the message broker service 104, the quorum evaluator 116 may identify a messaging environment trigger and change the quorum size to five messaging nodes. Thus, difference between FIG. 2A and FIG. 2B shows a change in quorum size from three to five based on a messaging environment trigger.

Figure 3:
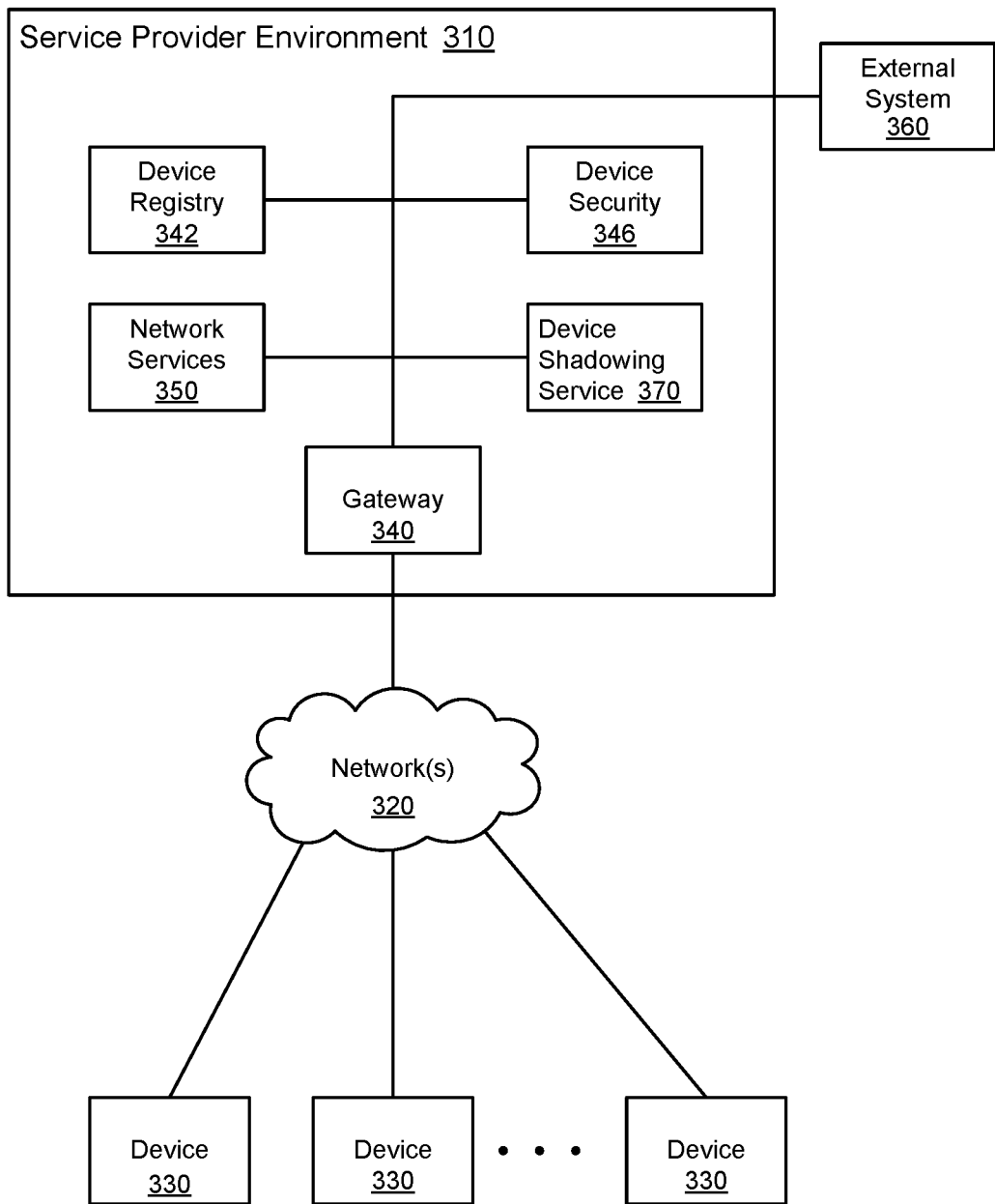
FIG. 3 illustrates a block diagram of an example computer networking architecture for providing devices access to network services in a service provider environment.

FIG. 3 is a block diagram illustrating an example service provider environment 310 with which the devices 330 described earlier may communicate. Particularly, the environment of FIG. 3 may be useful for IoT devices as described earlier. IoT device may be able to use the services illustrated in FIG. 3 and once connected use the messaging service of the technology described in FIG. 1A, 1B, and FIG. 2. The service provider environment 310, which may be referred to as a device communication environment or system that comprises various resources made accessible via a gateway server 340 to the devices 330 that access the gateway server 340 via a network 320. The devices 330 may access the service provider environment 310 in order to access services such as a device shadowing service 370, data storage, and computing processing features. Services operating in the service provider environment 310 may communicate data and messages to the devices 330 in response to requests from the devices 330 and/or in response to computing operations within the services.

The service provider environment 310 may comprise communicatively coupled component systems 340, 342, 346, 350 and 370 that operate to provide services to the devices 330. The gateway server 340 may be configured to provide an interface between the devices 330 and the service provider environment 310. The gateway server 340 receives requests from the devices 330 and forwards corresponding data and messages to the appropriate systems within the service provider environment 310. Likewise, when systems within the service provider environment 310 attempt to communicate data instructions to the devices 330, the gateway server 340 routes those requests to the correct device 330.

The gateway server 340 may be adapted to communicate with varied devices 330 using various different computing and communication capabilities. For example, the gateway server 340 may be adapted to communicate using either TCP (Transmission Control Protocol) or UDP (User Datagram Protocol) protocols. Likewise, the gateway server 340 may be programmed to receive and communicate with the devices 330 using any suitable protocol including, for example, MQTT, CoAP, HTTP, and HTTPS. The gateway server 340 may be programmed to convert the data and instructions or messages received from the devices 330 into a format that may be used by other server systems comprised in the service provider environment 310. In one example, the gateway server 340 may be adapted to convert a message received using the HTTPS protocol into a JSON formatted message that is suitable for communication to other servers within the service provider environment 310.

The gateway server 340 may store, or may control the storing, of information regarding the devices 330 that have formed a connection to the particular gateway server 340 and for which the particular gateway server 340 may be generally relied upon for communications with the device 330. In one example, the gateway server 340 may have stored thereon information specifying the particular device 330 such as a device identifier. For each connection established from the particular device 330, the gateway server 340 may also maintain information identifying the connection. For example, a connection identifier may be generated and stored for each connection established with a particular device 330. Information relating to the particular connection may also be stored. For example, information identifying the particular socket of the gateway server 340 on which the connection was established, as well as information identifying the particular protocol used by the device 330 on the connection may be stored by the gateway server 340. Information such as the socket and protocol may be used in order to facilitate further communications via the particular connection.

In one example, the gateway server 340 may communicate via any suitable networking technology with a device registry server 342. The device registry server 342 may be adapted to track the attributes and capabilities of each device 330. In an example, the device registry sever 342 may be provisioned with information specifying the attributes of the devices 330. The device registry server 342 may comprise data specifying rules or logic (e.g., automation rules) for handling various requests that may be received from the devices 330. The device registry server 342 may be programmed to convert specialized device functions or commands received in particular communication protocols such as, for example HTTPS, MQTT, CoAP, into functions or commands using particular protocols that are understood by other of the servers in the service provider environment 310. In one example, the device registry server 342 may be provisioned with information specifying that upon receipt of a particular request from a particular device 330, a request should be made to store the payload data of the request in a particular network service server 350. The device registry server 342 may be similarly programmed to receive requests from servers 342, 350 and convert those requests into commands and protocols understood by the devices 330.

The device shadowing service server 370 maintains state information for each connected device 330. In an example embodiment, the device shadowing service server 370 maintains for each device 330 that has connected to the environment 310 information specifying a plurality of states. In an example scenario, the device shadowing service server 370 may comprise a recorded state and a desired state. The recorded state represents the existing state of the particular device 330 as presently known to the device shadowing service server 370. The device shadowing service server 370 may be configured to manage multi-step device state transitions as described earlier. The device shadowing service server 370 communicates with the device gateway 340 in order to communicate requests to update a status to a particular device 330. For example, the device shadowing sever 370 may communicate to the device gateway 340 a sequence of state transition commands that update the status of a device 330. The device gateway 340 may, in response, communicate the appropriate commands formatted for the particular device.

The device security server 346 maintains security-related information for the devices 330 that connect to the service provider environment 310. In one example, the device security server 346 may be programmed to process requests to register devices with the service provider environment 310. For example, entities such as device manufacturers, may forward requests to register devices 330 with the service provider environment 310. The device security server 346 receives registration requests and assigns unique device identifiers to devices 330 which use the device identifiers on subsequent requests to access the service provider environment 310. The device security server 346 stores, for each registered device, authentication information that may be provided during the device registration process. For example, a request to register a device 330 may comprise information identifying the device 330 such as a device serial number and information for use in authenticating the device 330. In one example, the information may comprise a digital certificate and may comprise a public key of a public key-private key pair. The information may be stored in relation to the assigned device identifier for the particular device 330. When the device 330 subsequently attempts to access the service provider environment 310, the request may be routed to the device security server 346 for evaluation. The device security server 346 determines whether authentication information provided in the request is consistent with the authentication information stored in relation to the device identifier and provided during the registration process.

The device security server 346 may be further programmed to process request to associate particular entities (individuals or organizations) with particular devices 330. The device security server 346 may be adapted to receive requests to register entities, which may be, for example, individuals, users, accounts, and/or organizations, as authorized to control or communicate with a particular device 330. In one example, a request may be received from an individual or organization that may have purchased a device 330 from a manufacturer. For example, the device may be a dishwasher, thermostat, or lighting assembly that an individual or organization purchased from the manufacturer. The individual or organization may initiate a request to register the device 330 with the individual or an organization with which the organization is associated. The request may be routed to a web services server which may be comprised in service provider environment 310 or which communicates the request to the service provider environment 310. The request identifies the device 330 and the particular entity (individual or organization) that is requesting to be associated with the device 330. In one example, the request may comprise a unique device identifier that was assigned when the device 330 was registered with the system. The request further may comprise information uniquely identifying the entity that is registering as having authority to communicate with and/or control the particular device 330.

The device security server 346 stores the information identifying the particular entity in relation with the device identifier. When the particular entity subsequently attempts to control or communicate data to the particular device 330, the device security server 346 may use the information to confirm that the particular entity is authorized to communicate with or control the particular device 330. When an entity that has not been registered as being authorized to communicate with the device 330 attempts to communicate with or control the device 330, the device security server 346 may use the information stored in the device security server 346 to deny the request.

A network services server 350 may be any resource or processing server that may be used by any of servers 340, 342, 346, or 370 in processing requests from the devices 330. In one example, network services server 350 may provide data storage and retrieval services and/or on-demand processing capacity. In an example scenario, the network services server 350 may be any of numerous network accessible services including, for example, web or cloud-based services. In one example, the web services server 350 may be programmed to provide particular processing for particular devices 330 and/or groups of devices 330. For example, a network services server 350 may be provisioned with software that coordinates the operation of a particular set of devices 330 that control a particular manufacturing operation.

Servers 340, 342, 346, 350, and 370 may be communicatively coupled via any suitable networking hardware and software. For example, the servers may communicate via a local area network or wide area network.

An external system 360 may access service provider environment 310 for any number of purposes. In one example, an external system 360 may be a system adapted to forward requests to register devices 330 with the service provider environment 310. For example, an external system 360 may include a server operated by or for a device manufacturer that sends requests to service provider environment 310, and device security server 346 in particular, to register devices 330 for operation with service provider environment 310. Similarly, the external system 360 may be a system operated to provide a gateway for entities (individuals or organizations) to register an ownership or control relationship with a particular device 330.

The devices 330 may be any devices that may be communicatively coupled via a network 320 with the service provider environment 310. For example, the devices 330 may be computing devices such as smart phones and tablet computers, automobiles, appliances such as washers and driers, industrial sensors, switches, control systems, etc. In one example, each of devices 330 may communicate over the network 320 to store data reflecting the operations of the particular device 330 and/or to request processing provided by, for example, network services server 350. While FIG. 3 depicts three devices 330, it will be appreciated that any number of devices 330 may access the service provider environment 310 via the gateway server 340. Further it will be appreciated that the devices 330 may employ various different communication protocols. For example, some devices 330 may transport data using TCP, while others may communicate data using UDP. Some devices 330 may use MQTT, while others may use CoAP, and still others may use HTTPs. It will also be appreciated that each of devices 330 may be programmed to send and receive particular functions or commands in its requests that are not compatible with other devices or even the systems within service provider environment 310. The gateway server 340 may be programmed to receive and, if needed, attend to converting such requests for processing with the service provider environment 310.

Figure 4:
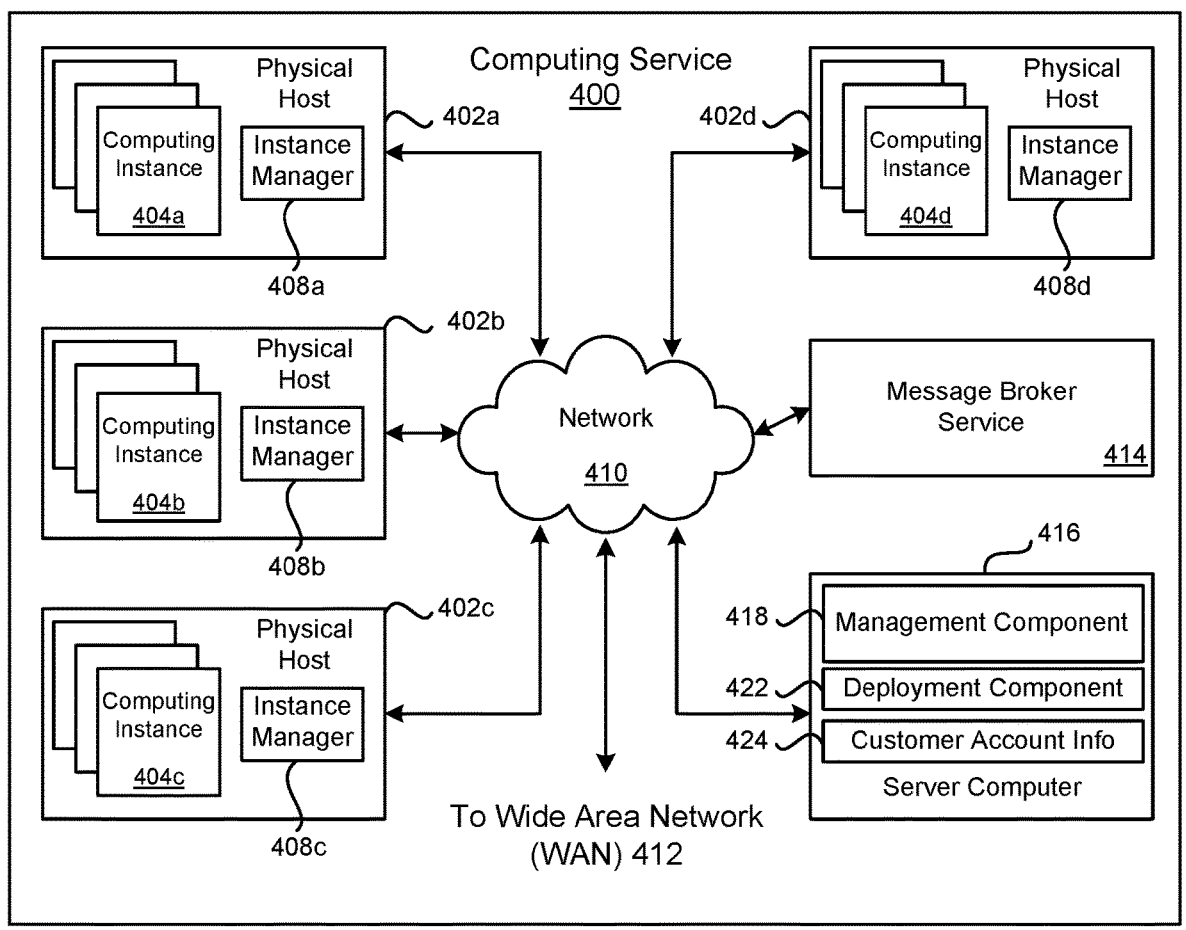
FIG. 4 is a block diagram that illustrates an example computing service environment according to an example of the present technology.

FIG. 4 is a block diagram illustrating an example computing service 400 that may be used to execute software services in a computing service environment or service provider environment. In particular, the computing service 400 depicted illustrates one environment in which the technology described herein may be used. The computing service 400 may be one type of environment that includes various virtualized service resources that may be used, for instance, to host computing instances 404a-d on which a computing service may execute.

The computing service 400 may be capable of delivery of computing, storage and networking capacity as a software service to a community of end recipients. In one example, the computing service 400 may be established for an organization by or on behalf of the organization. That is, the computing service 400 may offer a "private cloud environment." In another example, the computing service 400 may support a multi-tenant environment, wherein a plurality of customers may operate independently (i.e., a public cloud environment). Generally speaking, the computing service 400 may provide the following models: Infrastructure as a Service ("IaaS"), Platform as a Service ("PaaS"), and/or Software as a Service ("SaaS"). Other models may be provided. For the IaaS model, the computing service 400 may offer computers as physical or virtual machines and other resources. The virtual machines may be run as guests by a hypervisor, as described further below. The PaaS model delivers a computing platform that may include an operating system, programming language execution environment, database, and web server.

Application developers may develop and run their software solutions on the computing service platform without incurring the cost of buying and managing the underlying hardware and software. The SaaS model allows installation and operation of application software in the computing service 400. End customers may access the computing service 400 using networked client devices, such as desktop computers, laptops, tablets, smartphones, etc. running web browsers or other lightweight client applications, for example. Illustratively, the computing service 400 may be described as a "cloud" environment.

The particularly illustrated computing service 400 may include a plurality of server computers 402a-d. While four server computers are shown, any number may be used, and large data centers may include thousands of server computers. The computing service 400 may provide computing resources for executing computing instances 404a-d. Computing instances 404a-d may, for example, be virtual machines. A virtual machine may be an instance of a software implementation of a machine (i.e., a computer) that executes applications like a physical machine. In the example of a virtual machine, each of the server computers 402a-d may be configured to execute an instance manager 408a-d capable of executing the instances. The instance manager 408a-d may be a hypervisor, virtual machine monitor (VMM), or another type of program configured to enable the execution of multiple computing instances 404a-d on a single server. Additionally, each of the computing instances 404a-d may be configured to execute one or more applications.

Some of the servers may be used for executing a service message request rate management operation service (e.g., service message rate throttling or auto-scaling operation service). For example, a server computer 414 may execute the message broker service in a service provider environment according to an example of the present technology.

One or more server computers 416 may be reserved to execute software components for managing the operation of the computing service 400 and the computing instances 404a-d. A server computer 416 may execute a management component 418. A customer may access the management component 418 to configure various aspects of the operation of the computing instances 404a-d purchased by a customer. For example, the customer may setup computing instances 404a-d and make changes to the configuration of the computing instances 404a-d.

A deployment component 422 may be used to assist customers in the deployment of computing instances 404a-d. The deployment component 422 may have access to account information associated with the computing instances 404a-d, such as the name of an owner of the account, credit card information, country of the owner, etc. The deployment component 422 may receive a configuration from a customer that includes data describing how computing instances 404a-d may be configured. For example, the configuration may include an operating system, provide one or more applications to be installed in computing instances 404a-d, provide scripts and/or other types of code to be executed for configuring computing instances 404a-d, provide cache logic specifying how an application cache may be prepared, and other types of information. The deployment component 422 may utilize the customer-provided configuration and cache logic to configure, initialize, and launch computing instances 404a-d. The configuration, cache logic, and other information may be specified by a customer accessing the management component 418 or by providing this information directly to the deployment component 422.

Customer account information 424 may include any desired information associated with a customer of the multi-tenant environment. For example, the customer account information may include a unique identifier for a customer, a customer address, billing information, licensing information, customization parameters for launching instances, scheduling information, etc. As described above, the customer account information 424 may also include security information used in encryption of asynchronous responses to API requests. By "asynchronous" it is meant that the API response may be made at any time after the initial request and with a different network connection.

A network 410 may be utilized to interconnect the computing service 400 and the server computers 402a-d, 416. The network 410 may be a local area network (LAN) and may be connected to a Wide Area Network (WAN) 412 or the Internet, so that end customers may access the computing service 400. The network topology illustrated in FIG. 4 has been simplified; many more networks and networking devices may be utilized to interconnect the various computing systems disclosed herein.

Figure 5:
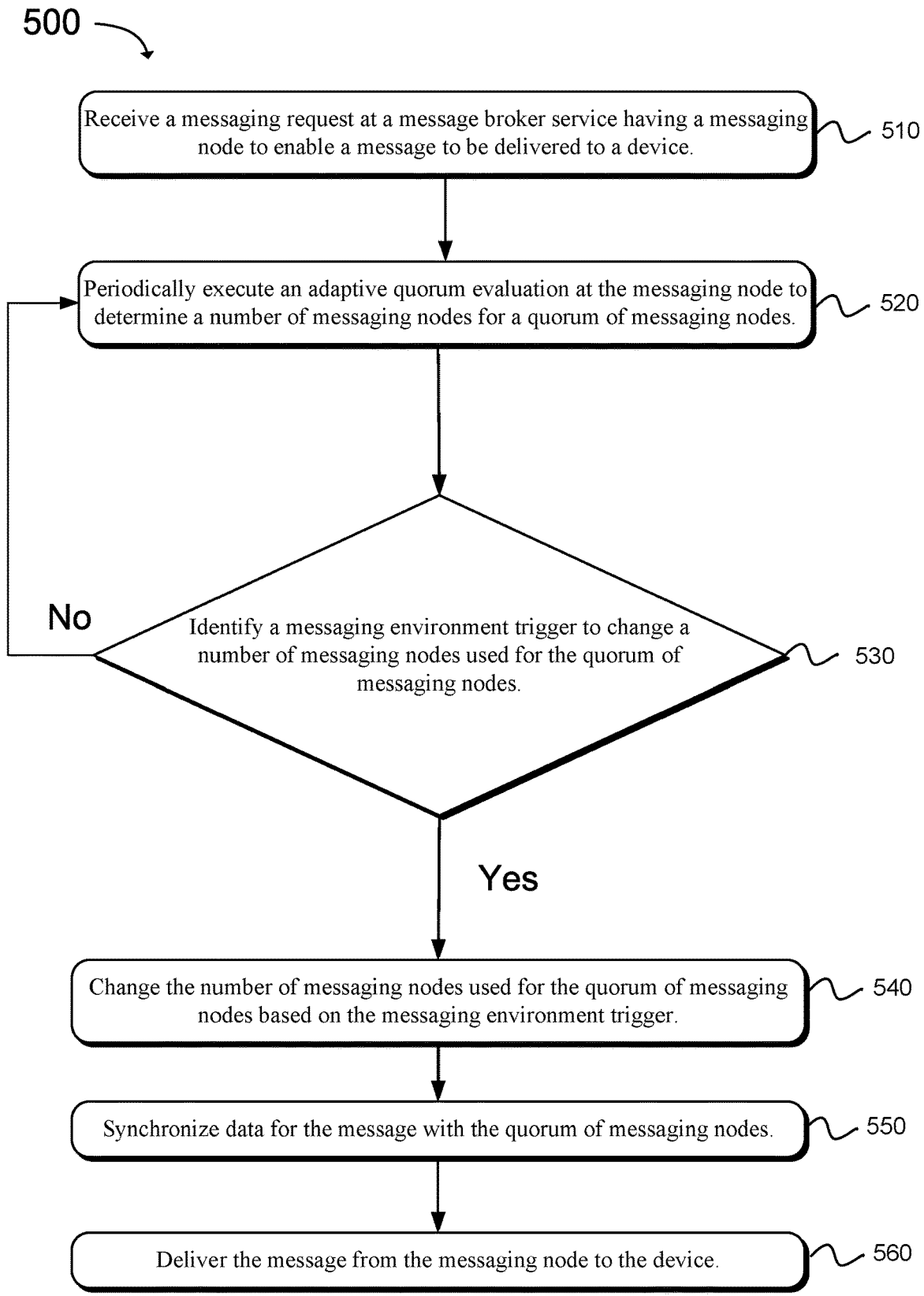
FIGS. 5 and 6 are flowcharts of an example methods for adapting a quorum size of messaging nodes in a service provider environment according to an example of the present technology.

FIG. 5 is a flowchart of an example method 500 for adapting a quorum size of messaging nodes in a service provider environment according to an example of the present technology. The functionality 500 may be implemented as a method and executed as instructions on a machine, where the instructions are included on at least one computer readable medium or one non-transitory machine-readable storage medium. For example, starting in block 510, a message request may be received at a message broker service having a messaging node to enable a message to be delivered to a device. An adaptive quorum evaluation may be periodically executed at the messaging node to determine a number of messaging nodes for the quorum of messaging nodes, as in block 520. An operation is performed to identify a messaging environment trigger to change a number of messaging nodes used for the quorum of messaging nodes, as in block 530. If no, the method may return to block 520 and continue to execute the adaptive quorum evaluation. If yes, the number of messaging nodes used for the quorum of messaging nodes may be changed based on the messaging environment trigger, as in block 540. The data for the message may be synchronized with the quorum of messaging nodes, as in block 550. The message may be delivered from the messaging node to the device, as in block 560.

In one aspect, the messaging request may come from a worker process associated with the message broker service. The messaging request may be a read request or other request associated with the message. In one aspect, the messaging request may come from the device to which the message will be delivered. In one aspect, the executable instructions of method 500 may identify a second messaging environment trigger, and subsequently change the number of messaging nodes for the quorum of messaging nodes based on the second messaging environment trigger. In addition, the adaptive quorum evaluation may comprise a consistency predictive function to detect the messaging environment trigger. Further, the message broker service may periodically call the consistency predictive function to determine the number of messaging nodes for the quorum of nodes. For example, the messaging environment trigger may include checking a change in a number of subscribers to a topic at the message broker service.

Figure 6:
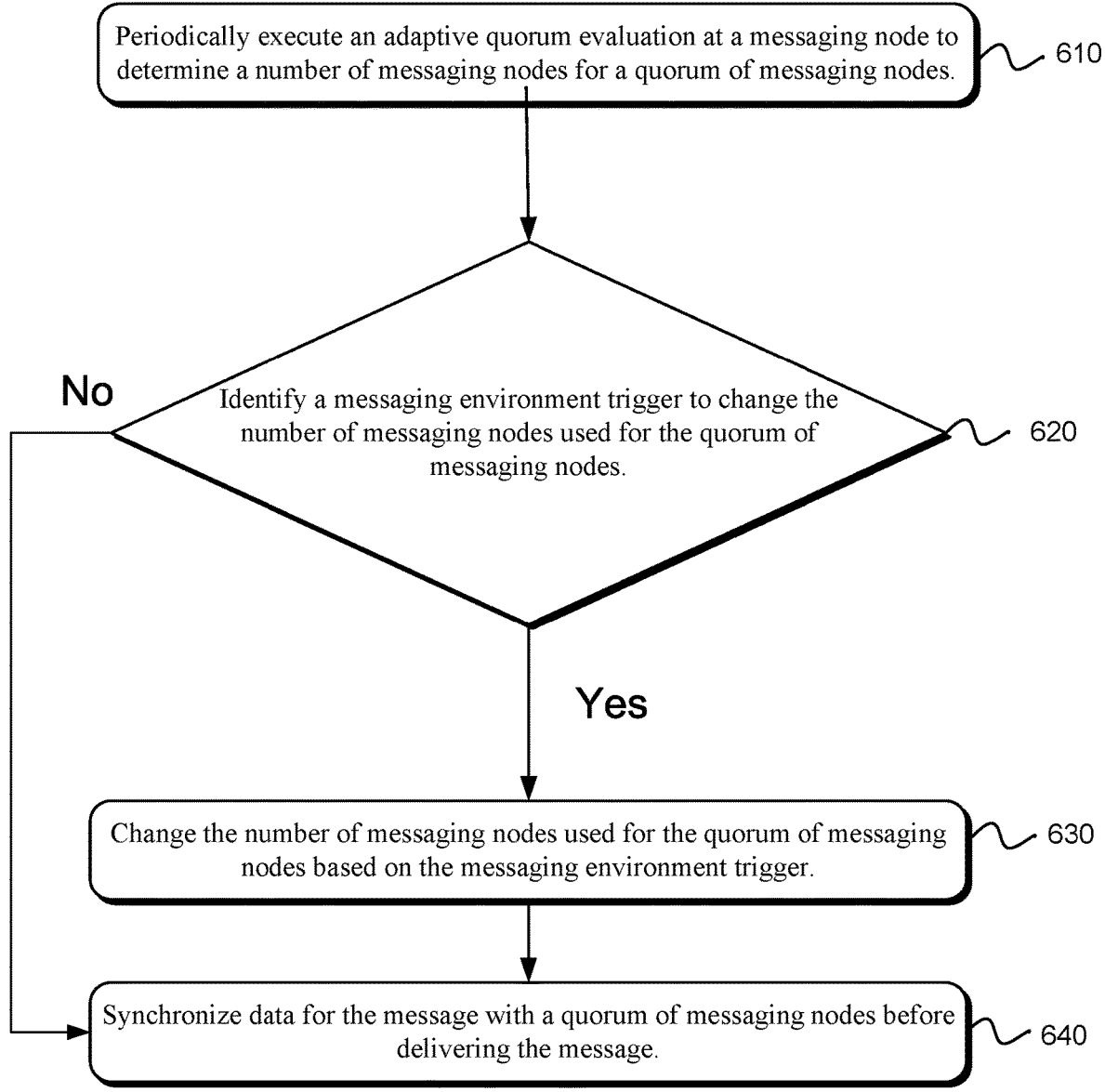

FIG. 6 is a flowchart of an example method 600 for adapting a quorum size of messaging nodes in a service provider environment according to an example of the present technology. The functionality 600 may be implemented as a method and executed as instructions on a machine, where the instructions are included on at least one computer readable medium or one non-transitory machine-readable storage medium. For example, starting in block 610, an adaptive quorum evaluation may be periodically executed at a messaging node to determine a number of messaging nodes for a quorum of messaging nodes. An operation is performed to identify a messaging environment trigger to change a number of messaging nodes used for the quorum of messaging nodes, as in block 620. If yes, the number of messaging nodes used for the quorum of messaging nodes may be changed based on the messaging environment trigger, as in block 630. If no, the method may proceed to block 640. Data for the message is synchronized with a quorum of messaging nodes before delivering the message, as in block 640.

In one aspect, the executable instructions of method 600 may deliver the message from the messaging node to the device. In addition, the executable instructions of method 600 may identify a second messaging environment trigger, and subsequently change the number of messaging nodes for the quorum of messaging nodes based on the second messaging environment trigger.

In one example aspect, an adaptive quorum evaluation may identify the triggering event and the change the number of messaging nodes used for the quorum of messaging nodes. The adaptive quorum evaluation may be referred to as a quorum evaluation and may be executed via a messaging node. More specifically, the adaptive quorum evaluation comprises a consistency predictive function to detect the messaging environment trigger. The consistency predictive function may be used to detect an actual or predicted data transmission load in a service provider environment where the messaging node is operating. In one aspect, the message broker service periodically calls the consistency predictive function to determine the number of messaging nodes used for the quorum of messaging nodes. For example, the number of messaging nodes used for a quorum (e.g., a size of a quorum) may dynamically change.

In one aspect, the message may be associated with a subscription topic associated with the message broker service. The topic may be hosted by a messaging node and the device the device may publish data to the topic. The data published may then be pushed to a subscriber of the topic. The subscription topic may be part of a publish-subscribe model where a subscription management component is employed by the message broker service to manage the subscriptions to topics. In one aspect, the messaging environment trigger is a change in a number of subscribers to a topic at the message broker service. For example, the number of subscribers to a topic increases, then the size of a quorum for a messaging node hosting that topic will increase. Conversely, if the number of subscribers decreases, then the size of the quorum may decrease as well.

In one aspect, the messaging environment trigger is a change in a data transmission load across a plurality of messaging nodes associated with the same quorum of messaging nodes. Data transmission loads may be detected using various techniques such as detecting the aggregate bandwidth of messages, the number of messages, the size of messages, etc. The data transmission load may increase or decrease due to various factors. As the data transmission load increases or decreases, the size of the quorum may increase and decrease as well. The adaptive quorum evaluation may detect if the data transmission load has increased for a given topic and increase or decrease quorum size for a messaging node related to that topic.

In one configuration, the messaging environment trigger is a period of time when a data transmission load for the messaging node is predicted to increase. For example, the consistency predictive function may predict that data transmission loads related to a given topic tend to spike in traffic routinely at the same time of day. Therefore, it may be predicted that same period of time the next day, or for all days, will see an increase in traffic. The quorum may then be adjusted accordingly for that period of time to anticipate the increase in traffic and thus decrease the likelihood of errors in delivering messages. In one aspect, the messaging environment trigger is when another messaging node in the same quorum with the messaging node is offline. The other messaging node may be offline due to a scheduled event for maintenance or other activity, or the other messaging node may be offline due to a failure. In one aspect, a gossip evaluation associated with the messaging node is executed to determine if another messaging node associated with the messaging node is offline.

Figure 7:
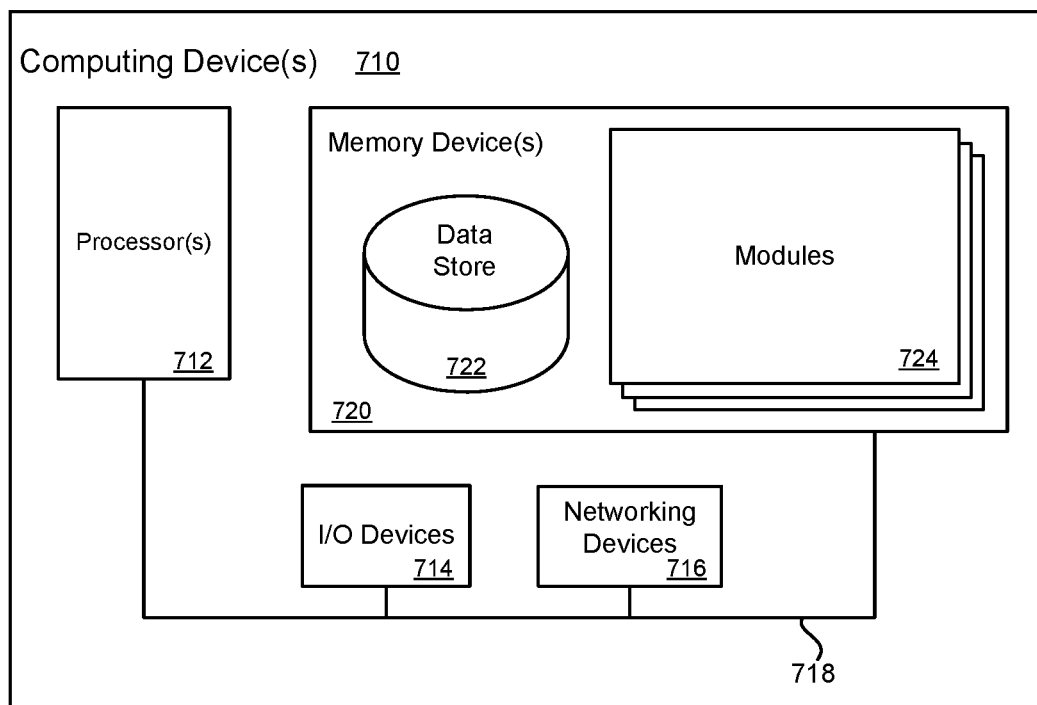
FIG. 7 is a block diagram that provides an example illustration of a computing device that may be employed in the present technology.

FIG. 7 illustrates a computing device 710 on which modules of this technology may execute. A computing device 710 is illustrated on which a high level example of the technology may be executed. The computing device 710 may include one or more processors 712 that are in communication with memory devices 720. The computing device may include a local communication interface 718 for the components in the computing device. For example, the local communication interface may be a local data bus and/or any related address or control busses as may be desired.

The memory device 720 may contain modules 724 that are executable by the processor(s) 712 and data for the modules 724. The modules 724 may execute the functions described earlier. A data store 722 may also be located in the memory device 720 for storing data related to the modules 724 and other applications along with an operating system that is executable by the processor(s) 712.

Other applications may also be stored in the memory device 720 and may be executable by the processor(s) 712. Components or modules discussed in this description that may be implemented in the form of software using high programming level languages that are compiled, interpreted or executed using a hybrid of the methods.

The computing device may also have access to I/O (input/output) devices 714 that are usable by the computing devices. An example of an I/O device is a display screen that is available to display output from the computing devices. Other known I/O device may be used with the computing device as desired. Networking devices 716 and similar communication devices may be included in the computing device. The networking devices 716 may be wired or wireless networking devices that connect to the Internet, a LAN, WAN, or other computing network.

The components or modules that are shown as being stored in the memory device 720 may be executed by the processor 712. The term "executable" may mean a program file that is in a form that may be executed by a processor 712. For example, a program in a higher level language may be compiled into machine code in a format that may be loaded into a random access portion of the memory device 720 and executed by the processor 712, or source code may be loaded by another executable program and interpreted to generate instructions in a random access portion of the memory to be executed by a processor. The executable program may be stored in any portion or component of the memory device 720. For example, the memory device 720 may be random access memory (RAM), read only memory (ROM), flash memory, a solid-state drive, memory card, a hard drive, optical disk, floppy disk, magnetic tape, or any other memory components.

The processor 712 may represent multiple processors and the memory 720 may represent multiple memory units that operate in parallel to the processing circuits. This may provide parallel processing channels for the processes and data in the system. The local interface 718 may be used as a network to facilitate communication between any of the multiple processors and multiple memories. The local interface 718 may use additional systems designed for coordinating communication such as load balancing, bulk data transfer, and similar systems.

While the flowcharts presented for this technology may imply a specific order of execution, the order of execution may differ from what is illustrated. For example, the order of two more blocks may be rearranged relative to the order shown. Further, two or more blocks shown in succession may be executed in parallel or with partial parallelization. In some configurations, one or more blocks shown in the flow chart may be omitted or skipped. Any number of counters, state variables, warning semaphores, or messages might be added to the logical flow for purposes of enhanced utility, accounting, performance, measurement, troubleshooting or for similar reasons.

Some of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more blocks of computer instructions, which may be organized as an object, procedure, or function. Nevertheless, the executables of an identified module need not be physically located together, but may comprise disparate instructions stored in different locations which comprise the module and achieve the stated purpose for the module when joined logically together.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices. The modules may be passive or active, including agents operable to perform desired functions.

The technology described here may also be stored on a computer readable storage medium that includes volatile and non-volatile, removable and non-removable media implemented with any technology for the storage of information such as computer readable instructions, data structures, program modules, or other data. Computer readable storage media include, but is not limited to, RAM, ROM, EEPROM, flash memory or other memory technology, CD-ROM, digital versatile disks (DVD) or other optical storage, magnetic cassettes, magnetic tapes, magnetic disk storage or other magnetic storage devices, or any other computer storage medium which may be used to store the desired information and described technology.

The devices described herein may also contain communication connections or networking apparatus and networking connections that allow the devices to communicate with other devices. Communication connections are an example of communication media. Communication media typically embodies computer readable instructions, data structures, program modules and other data in a modulated data signal such as a carrier wave or other transport mechanism and includes any information delivery media. A "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency, infrared, and other wireless media. The term computer readable media as used herein includes communication media.

Reference was made to the examples illustrated in the drawings, and specific language was used herein to describe the same. It will nevertheless be understood that no limitation of the scope of the technology is thereby intended. Alterations and further modifications of the features illustrated herein, and additional applications of the examples as illustrated herein, which would occur to one skilled in the relevant art and having possession of this disclosure, are to be considered within the scope of the description.

Furthermore, the described features, structures, or characteristics may be combined in any suitable manner in one or more examples. In the preceding description, numerous specific details were provided, such as examples of various configurations to provide a thorough understanding of examples of the described technology. One skilled in the relevant art will recognize, however, that the technology may be practiced without one or more of the specific details, or with other methods, components, devices, etc. In other instances, well-known structures or operations are not shown or described in detail to avoid obscuring aspects of the technology.

Although the subject matter has been described in language specific to structural features and/or operations, it is to be understood that the subject matter defined in the appended claims is not necessarily limited to the specific features and operations described above. Rather, the specific features and acts described above are disclosed as example forms of implementing the claims. Numerous modifications and alternative arrangements may be devised without departing from the spirit and scope of the described technology.

What is claimed is:

1. A method for adapting a quorum size of messaging nodes, comprising:
    under control of one or more computer systems configured with executable instructions:
        receiving a messaging request at a message broker service having a messaging node to enable a message to be delivered to a device;
        periodically executing an adaptive quorum evaluation at the messaging node to determine a number of messaging nodes for a quorum of messaging nodes, wherein an initial number of messaging nodes is used to establish the quorum of messaging nodes;
        identifying a messaging environment trigger to change a number of messaging nodes used for the quorum of messaging nodes, wherein the messaging environment trigger is based on factors that are associated with weighting values;
        changing the initial number of messaging nodes to a second number of messaging nodes used to establish the quorum of messaging nodes when a threshold value is exceeded by a value computed using a mathematical analysis that is determined using the weighting values;
        synchronizing data for the message with the quorum of messaging nodes; and
        delivering the message from the messaging node to the device.

2. The method of claim 1, wherein the adaptive quorum evaluation comprises a consistency predictive function to detect the messaging environment trigger.

3. The method of claim 1, wherein the message broker service periodically calls a consistency predictive function to determine the number of messaging nodes for the quorum of nodes.

4. The method of claim 1, further comprising
    identifying a second messaging environment trigger; and
    subsequently changing the number of messaging nodes for the quorum of messaging nodes based on the second messaging environment trigger.

5. The method of claim 1, wherein the messaging environment trigger is a change in a number of subscribers to a topic at the message broker service.

6. A method for adapting a quorum size of messaging nodes, comprising:
    under control of one or more computer systems configured with executable instructions:
        executing an adaptive quorum evaluation to determine a number of messaging nodes for a quorum of messaging nodes, wherein an initial number of messaging nodes is used to establish the quorum of messaging nodes;
        identifying a messaging environment trigger to change the number of messaging nodes used for the quorum of messaging nodes, wherein the messaging environment trigger is based on factors that are associated with weighting values;
        changing the initial number of messaging nodes to a second number of messaging nodes used to establish the quorum of messaging nodes when a threshold value is exceeded by a value computed using a mathematical analysis that is determined using the weighting values; and
        synchronizing data for a message with a quorum of messaging nodes before delivering the message.

7. The method of claim 6, further comprising:
    delivering the message from the messaging node to a device.

8. The method of claim 6, wherein identifying a triggering event for the messaging environment trigger and changing the number of messaging nodes used for the quorum of messaging nodes is performed via an adaptive quorum evaluation.

9. The method of claim 8, wherein the adaptive quorum evaluation comprises a consistency predictive function to detect the messaging environment trigger.

10. The method of claim 9, wherein a message broker service periodically calls the consistency predictive function to determine the number of messaging nodes to be used for the quorum of messaging nodes.

11. The method of claim 6, further comprising
identifying a second messaging environment trigger; and
changing the number of messaging nodes used for the quorum of messaging nodes based on the second messaging environment trigger.

12. The method of claim 6, wherein the message is associated with a subscription topic associated with a message broker service.

13. The method of claim 6, wherein the messaging environment trigger is a change in a number of subscribers to a topic at a message broker service.

14. The method of claim 6, wherein the messaging environment trigger is a change in a data transmission load across a plurality of messaging nodes associated with the quorum of messaging nodes.

15. The method of claim 6, wherein the messaging environment trigger is a period of time when a data transmission load for the messaging node is predicted to increase.

16. The method of claim 6, wherein the messaging environment trigger is when another messaging node in a same quorum with the messaging node is offline.

17. The method of claim 16, wherein a gossip evaluation associated with the messaging node is executed to determine if another messaging node associated with the messaging node is offline.

18. A system for adapting a quorum size of messaging nodes, comprising:
a messaging node comprising:
a processor; and
a memory device including instructions to be executed by the processor, comprising:
a message broker service configured to receive a messaging request for a message to be delivered to a device;
an adaptive quorum evaluator to periodically perform an adaptive quorum evaluation to identify a messaging environment trigger, wherein the messaging environment trigger is based on factors that are associated with weighting values, and to change a number of messaging nodes from an initial number of messaging nodes to a second number of messaging nodes to establish a quorum of messaging nodes when a threshold value is exceeded by a value computed using a mathematical analysis that is determined using the weighting values; and
a plurality of messaging nodes configured to synchronize data for the message between the quorum of messaging nodes before delivering the message.

19. The system of claim 18, wherein the adaptive quorum evaluation comprises a consistency predictive function to detect the messaging environment trigger.

20. The system of claim 18, wherein the messaging environment trigger is a change in a number of subscribers to a topic at the message broker service.

* * * * *